United States Patent [19]

Dumesnil et al.

[11] 4,002,799
[45] Jan. 11, 1977

[54] GLASS SEALED PRODUCTS

[75] Inventors: Maurice E. Dumesnil, Palo Alto; Ulrich Schreier, San Mateo, both of Calif.

[73] Assignee: Technology Glass Corporation, Sunnyvale, Calif.

[22] Filed: Feb. 17, 1976

[21] Appl. No.: 658,660

Related U.S. Application Data

[63] Continuation-in-part of Ser. No. 418,247, Nov. 23, 1973, Pat. No. 3,963,505.

[52] U.S. Cl. ............................ 428/428; 428/432; 106/47 R; 106/53; 106/39.6; 65/43
[51] Int. Cl.² ............... B32B 17/06; C03C 27/00; C03C 3/14; C03C 3/10
[58] Field of Search ............ 106/47 R, 53, 39.6; 65/43; 428/209, 210, 427, 428, 432

[56] References Cited

UNITED STATES PATENTS

| | | | |
|---|---|---|---|
| 3,061,664 | 10/1962 | Kegg | 106/53 |
| 3,250,631 | 5/1966 | Lusber | 106/47 R |
| 3,258,350 | 6/1966 | Martin et al. | 106/47 R |
| 3,462,252 | 8/1969 | Veres | 106/53 |
| 3,645,761 | 2/1972 | Kawamura et al. | 106/47 R |
| 3,755,720 | 8/1973 | Kera | 106/53 |
| 3,778,242 | 12/1973 | Francel et al. | 106/47 R |

*Primary Examiner*—Patrick P. Garvin
*Assistant Examiner*—Mark Bell

[57] ABSTRACT

Sealed semiconductor packages and the like and a method of making them are described. The sealant compositions employed are mixtures of finely divided solder glass and an oxygen containing zinc material. The solder glasses are either lead-boron glasses or lead-zinc-boran glasses in which the zinc-lead mol ratio is below 1:2.

7 Claims, No Drawings

GLASS SEALED PRODUCTS

This application is a continuation-in-part of application Ser. No. 418,247 filed Nov. 23, 1973 now U.S. Pat. No. 3,963,505.

BACKGROUND OF THE INVENTION

Effort has been made in the past, without success, to provide the electronic industry with a glass material for sealing semiconductor ceramic packages at the lowest possible temperature and with sufficient mechanical strength to maintain hermeticity during thermal shocks and other conditions as specified by the MIL-STD-883 specifications.

The technical requirements of an adequate sealing glass material are severe. The material problem has arisen particularly with the development of the dual-in-line type ceramic packaging technology and its wide acceptance as a relatively inexpensive multilead hermetic package for integrated semiconductor circuits. The glass seal must not only bond two ceramic parts together but must also provide a strong hermetic seal with a substantially mismatched expansion metal lead frame within the glass layer.

Similarly, in the formation of cathode ray tubes, in order not to damage the heat sensitive phosphor coating, metallic film shield or electrical contact, glass parts must be sealed at the lowest possible temperature.

Heretofore successful sealing materials for the above applications have been made with glasses, known generically as solder glasses, containing mainly lead, zinc and boron oxides, mixed as a powder with an inert, low expansion ceramic powder such as beta-eucryptite, fused silica, or zirconium silicate to modify the internal structure of the glass once the seal has been formed by heat induced recrystallization. The presence of a multitude of crystals within the glass layer, plus the presence of a low expansion ceramic filler, prevents the propagation of surface cracks through the glass-polycrystalline seal which is subjected to considerable tensile stresses. The sealing temperatures of these materials are commonly too high to be used with many semiconductor devices, namely, those known in the semiconductor industry as MOS (Metal Oxide Silicon), LIC (Linear Integrated Circuits) and CCD (Charge Coupled Devices) integrated circuits, which are surface sensitive and prone to failure when heated over about 430° C.

SUMMARY OF THE INVENTION

The low melting glass-filler compositions of this invention permit a glass seal to be made at approximately 400° C. These glass seals tolerate imbedded metal leads with substantial expansion mismatch and maintain hermeticity even after a considerable number of liquid to liquid thermal shocks. This is a stress condition which even the higher temperature sealing glasses do not easily pass. Moreover, these glass-filler compositions provide hermetic sealing for surface sensitive semiconductor devices in ceramic packages of large, as well as small, size.

Briefly, the invention comprises glass compositions containing lead, zinc, and boron oxides as the major components in which the zinc oxide content is made deliberately lower than the composition corresponding to the $2PbO-ZnO-B_2O_3$ molar ratio (2:1:1 molar ratio). Such glass compositions are very low melting and have softening points as low as 300° C. These glass compositions are mixed in powder form with sufficient non-inert zinc oxide containing filler powder to convert the glass to a zinc oxide rich glass. This filler powder is used in amount such that its available zinc oxide content is sufficient to permit the hot mixture to partially or completely crystallize forming a solid crystalline phase in which the $PbO-ZnO-B_2O_3$ molar ratio approaches 2:1:1. On melting, the glass initially flows to form a seal and is converted from a lead-boron rich glass to a zinc oxide enriched glass preferably corresponding to the molar ratio of 2 moles of lead oxide to 1 mole of boron oxide as available ZnO dissolves. The amount of zinc oxide containing filler added to the solder glass is sufficient to constitute 3—30% by weight of the glassfiller mixture. Very high mechanical strength is imparted by a polycrystalline structure containing well dispersed filler powder. The presence of the dispersed filler powder results from the employment of zinc oxide contributing fillers in amounts exceeding the amount required to produce a $PbO-ZnO-B_2O_3$ ratio of 2:1:1. Employment of filler in amounts exceeding 30% by weight of the glass-filler mixtures should be avoided.

DESCRIPTION OF THE PREFERRED EMBODIMENT

Experience has shown that adequate mechanical strength in mismatched glass-to-glass, glass-to-ceramic and ceramic-to-ceramic glass seals can best be obtained with glasses which become recrystallized after the seal is formed. This is particularly true in semiconductor packaging seals in which metal leads are imbedded through the glass layer. A well known example is the type of ceramic packages generally known as the dual-in-line packages (CerDip) in which a complex etched or punched metal lead frame is imbedded between two glass layers supported by two alumina ceramic parts. The thermal expansion mismatch between the glass, the metal frame and the ceramic parts is appreciable and of the order of 15 to $20\times10^{-7}$ per degree C.

The term recrystallization, or devitrification, is used here in its conventional sense to mean a crystallization of glass wherein the glass is converted, or devitrified, to a crystalline phase, that is a rigid crystalline skeleton which may be associated with a glassy matrix and wherein thermal and other material characteristics or properties, such as viscosity and expansion, differ from those of the parent glass and are substantially determined by the crystalline phase.

The only glass materials which have been successful so far in being able to maintain hermeticity in these packages of the order of $10^{-8}$ and $10^{-9}$ std. cc/sec and mechanical strength after thermal cycling and thermal shock from about 150° C. to $-65°$ C. are recrystallizable glasses containing lead, zinc and boron oxides mixed with an inert, refractory metal oxide powder. These glasses recrystallize to near completeness to form a compound with the 2:1:1 lead oxide-zinc oxide-boron oxide stoichiometry.

The presence of a multitude of crystals within the glass seal, plus the presence of a low expansion, inert refractory metal oxide filler, prevents the propagation of surface cracks through the resulting glassy-polycrystalline seal. It is of importance when preparing this type of seal to choose a time-temperature cycle which insures completeness in the recrystallization of the glass. Improper or incomplete recrystallization severely weakens the mechanical strength and the hermeticity of the seal.

Presently available sealing glasses are not well suited for the production of hermetically sealed ceramic packages, particularly those with the CerDip geometry, at sealing temperatures appreciably below 450° C. maintained only for short times, e.g., less than 20 minutes at peak temperature.

The new sealing glass-filler compositions according to this invention combine a low melting lead oxide rich solder glass with a non-inert filler powder containing zinc oxide. Zinc oxide in pure or combined form has a tendency to dissolve in the glass when the glass is reheated, the rate of dissolution depending on the zinc oxide compound used. The filler powder is non-inert in the sense that it dissolves in the solder glass and modifies the physical and chemical properties of that glass.

Heretofore, dissolution of an added filler has been assumed to be undesirable because generally weak seals resulted from it, soluble filler materials have therefore been largely avoided. It has now been found that zinc oxide dissolves in and changes the compositions of zinc poor $PbO-ZnO-B_2O_3$ glasses to zinc richer glasses which can recrystallize to the $2PbO-ZnO-B_2O_3$ crystalline phase and have unusually high strength.

Accordingly, it is an object of this invention to provide a method for modifying a very low melting, high lead solder glass by the addition of a sufficient amount of filler material, which can be dissolved by the glass to provide enough zinc to produce a $2PbO-ZnO-B_2O_3$ crystalline phase with practially no glassy phase left within the seal.

Accordingly, it is another object to combine a zinc bearing filler with a zinc-free lead borate glass or with a lead-zinc borate glass in which the zinc oxide is lower than 13.6% by weight (and therefore quite insufficient to insure complete recrystallization of the glass). These latter glasses possess a combination of low melting points and high fluidity which promote excellent wetting of the parts to be sealed at a very low temperature. Once the seal is formed, the zinc has begun dissolving into the glass, thus changing the glass composition toward the $2PbO-ZnO-B_2O_3$ ternary phase diagram point and inducing recrystallization of the glass.

It is yet another object to describe a general method by which a glass powder is mixed with a finely dispersed zinc containing filler. On melting the glass-filler mixture, the composition of the glass changes to a zinc rich glass which can recrystallize fully to form a mechanically strong seal. Thus, the concept of this invention is not limited to low melting glass-zinc filler mixtures but can be extended to include any glass with little or no tendency to recrystallize without the presence of zinc oxide.

Table 1 shows glass compositions, expressed in percent by weight, which illustrate lead-zinc-borate and lead-borate type glasses which have been found particularly suitable in making seals when combined with a zinc bearing ceramic powder and the combination is heated to temperatures of the order of 350° C. to 450° C.

Table 1

| | I | II | III | IV | V | VI | VII | VIII | IX | X | XI | XII | XIII | XIV | XV |
|---|---|---|---|---|---|---|---|---|---|---|---|---|---|---|---|
| PbO | 77.5 | 77.5 | 80.0 | 77.5 | 76.5 | 76.0 | 75.5 | 80.0 | 75.0 | 80.0 | 76.1 | 77.0 | 82.5 | 82.5 | 76 |
| ZnO | 10.0 | 10.0 | 10.0 | 10.0 | 11.0 | 13.0 | 12.0 | — | — | — | 9.5 | 10.0 | 5.0 | 3.0 | 11 |
| $B_2O_3$ | 7.5 | 9.0 | 7.5 | 10.0 | 9.0 | 9.0 | 9.0 | 10.0 | 20.0 | 15.0 | 10.4 | 7.5 | 10.0 | 10.0 | 9 |
| $SiO_2$ | 2.5 | 2.5 | 2.5 | 2.5 | 2.5 | 1.5 | 2.5 | 5.0 | 5.0 | 5.0 | 2.1 | 2.5 | 2.5 | 2.5 | 2 |
| $SnO_2$ | | | | | | 0.5 | 0.5 | | | | | | | | |
| $P_2O_5$ | | | | | | | 0.5 | | | | | | | | |
| $Al_2O_3$ | 2.5 | 1.0 | | | | | | 5.0 | | | | | | | |
| CuO | | | | | | | | | | | | 1.9 | | | |
| $Bi_2O_3$ | | | | | 1.0 | | | | | | | | 0.5 | 1.0 | |
| BaO | | | | | | | | | | | | | | 1.0 | 2 |

In Table 2 the molar compositions of the several glasses shown in Table 1 are set forth.

Table 2

| | I | II | III | IV | V | VI | VII | VIII | IX | X | XI | XII | XIII | XIV | XV |
|---|---|---|---|---|---|---|---|---|---|---|---|---|---|---|---|
| PbO | 0.35 | 0.35 | 0.36 | 0.35 | 0.34 | 0.34 | 0.34 | 0.36 | 0.34 | 0.36 | 0.34 | 0.34 | 0.37 | 0.37 | 0.34 |
| ZnO | 0.12 | 0.12 | 0.12 | 0.12 | 0.14 | 0.16 | 0.15 | — | — | — | 0.12 | 0.12 | 0.06 | 0.037 | 0.135 |
| $B_2O_3$ | 0.11 | 0.13 | 0.11 | 0.145 | 0.13 | 0.13 | 0.13 | 0.145 | 0.28 | 0.22 | 0.15 | 0.11 | 0.145 | 0.145 | 0.13 |
| $SiO_2$ | 0.04 | 0.04 | 0.04 | 0.04 | 0.04 | 0.025 | 0.04 | 0.08 | 0.08 | 0.08 | 0.03 | 0.04 | 0.04 | 0.04 | 0.03 |
| $SnO_2$ | | | | | | 0.003 | 0.003 | | | | | | | | |
| $P_2O_5$ | | | | | | | .0015 | | | | | | | | |
| $Al_2O_3$ | 0.025 | 0.01 | | | | | | 0.05 | | | | | | | |
| CuO | | | | | | | | | | | | 0.024 | | 0.013 | |
| $Bi_2O_3$ | | | | | 0.002 | | | | | | | | 0.03 | 0.002 | |
| BaO | | | | | | | | | | | | | | | 0.013 |

While these glasses are particularly effective in making devitrified glass seals when finely divided and mixed with a zinc oxide contributing filler, it will be appreciated that the invention may also be practiced with other low zinc oxide glasses. Suitable low zinc glasses are not only those shown in Tables 1 and 2 but include those containing 75–90% by weight of lead oxide, 10–25% by weight of boron oxide and 0–13% by weight of zinc oxide. The glass selected for making a given seal will depend on various factors including the properties of the materials being sealed, such as their expansion characteristics and softening point, the specified sealing conditions, particularly the temperature at which the seal is to be made or the permissible range of temperatures, and somewhat on the nature of the seal itself. With these factors established, one skilled in the glass art can then select or compound a semi-stable sealing glass material and determine the suitability of the glass material with the aid of sealing tests such as described subsequently.

The non-inert zinc oxide containing or contributing materials which can be added in the form of a powder, either singly or in any combinations, to the above described low meling glasses in the range of 3.0 to 30% bv weight, include the following: zinc aluminate, zinc borate, zinc carbonate, zinc chromate, zinc dichromate, zinc ferrate, zinc fluosilicate, zinc gallate, zinc hydroxide, zinc permanganate, zinc nitrate, zinc oxide, zinc orthophosphate, zinc aluminophosphate, zinc pyrophosphate, zinc silicate, zinc orthosilicate, zinc titanate, zinc ziroconate, zinc stannate, zinc zirconium spinel, and zinc zirconium silicate.

Successful practice of the present invention requires a soft sealing glass. That is to say, the glass must behave like a stable, soft sealing glass until a good seal is effected. A good seal between parts requires that the sealing glass be relatively soft and fluid at the sealing temperature so that it can flow over and completely wet the sealing surfaces of the preformed parts as well as completely fill the space between such surfaces. If the glass is too stiff, reentrant angles, folds and the like occur and the seal is mechanically and thermally weak. It is apparent then that the glass must be one which does not appreciably devitrify either during melting or in reheating prior to the formation of a seal.

It is desirable, however, that the sealing glass-filler material devitrify rapidly once a proper seal is formed. Preferably, glass devitrification is initiated at the selected sealing temperature thus permitting the assembly to be raised to the sealing temperature and then held at that temperature for a short time, that is, of the order of a few minutes to a quarter of an hour or so, while devitrification of the glass occurs.

For present purposes, the expansion of the parent sealing glass is of relatively little importance, since the physical properties of the glass-filler mixture with the glass in its devitrified state determine the amount and nature of the stress developed in the seal and these properties tend to be quite different from those of the parent glass. While physical properties of devitrified glass-filler mixtures, particularly expansion data, can be measured by conventional methods, it is more convenient to rely on mechanical strength and hermeticity data on the finished product. In the case of semiconductor ceramic packages, the MIL-STD-883 (issued by the Department of Defense on methods and procedures for testing mecroelectronic devices and their packages, including basic environmental tests) testing conditions should be used.

Accordingly, the glass seals made pursuant to this invention not only meet, but substantially exceed the more demanding test conditions of thermal shock (method 1011 — Condition C), thermal cycling (method 1010), corrosion (method 1009), high temperature storage (method 1008), hermeticity (method 1014) and high humidity (method 1004). These methods are described in Code FSC 5962 published by the United States Department of Defense, May 1, 1968.

In preparing a sealing glass-ceramic material for the present purpose, considerable care should be taken to avoid contamination of the glass during the mixing and smelting of the glass forming components and to insure a uniform composition throughout the melt. After the glass melt is cooled, it is reduced to a powdered form preferably being sufficiently fine to pass a standard 300 mesh screen. The powdered glass is thoroughly mixed with the desired zinc bearing filler which is present in quantities to constitute a 3.0 to 30% by weight of the mixture and preferably also fine enough to pass through a 300 mesh screen. The glassfiller mixture may then be mixed with a conventional organic binder and vehicle to form a suspension or slurry for application to a sealing surface. Any organic material used should be capable of completely burning out or volatilizing well below the sealing temperature of the sealing material. A solution of 1–3% ethyl cellulose T-200 in amyl acetate or higher molecular weight solvent is effective. The ratio of glass to vehicle and binder will depend to a large extent on the manner of application, the viscosity of the suspension being adjusted to provide the desired thickness and coverage of powder on the sealing surface. A great variety of organic vehicles may be employed, only limitations on its selection being that it not be thermally polymerizable and that it boil generally in the range 100°–300° C. Hydrocarbons, alcohols and esters are suitable vehicles. The ratio of solid to vehicle in the suspensions is usually in the range 7:1 to 12:1.

The suspension may be applied in various manners. Screen printing or spraying are desirable for the ceramic semiconductor packaging parts. For cathode ray tubes, the suspension may be applied by feeding through a constricted tubular type of reservoir to form a ring or strip just covering the sealing surface, or dipping the part into a pool of suspended sealing glass mixture.

Where the coated articles must be handled or stored, the coating is preglazed, that is, fused, or at least partially fused, prior to the actual sealing operation. In utilizing such preliminary glazing, it is important to avoid initiating devitrification since otherwise the sealing material may be sufficiently altered to interfere with the proper seal formation later on. The maximum permissible glazing temperature will depend then in large measure on the ease with which the glass-zinc filler mixture recrystallizes. It is generally desirable to employ lower glazing temperatures than the sealing temperature which may be of the order of 30° to 50° C. below the sealing temperature.

During the sealing cycle, once the assembly has been heated to the sealing temperature and the sealing glass caused to wet the sealing surfaces and flow into the desired seal configuration, the sealing glass is held at its devitrification temperature for a sufficient time for the desired devitrification to be completed and thereafter cooled to room temperature.

The various features of the invention and the benefits which it provides are more fully set forth in the following examples.

EXAMPLE 1

A sealing glass material was produced by milling 80 parts by weight glass IV with 20 parts of zinc silicate, both as powders passing through a standard 300 mesh screen. This mixture was applied to the surface of alumina ceramic parts. Heating the parts together at 430° C. for twenty minutes produced a very strong thermally devitrified glass-zinc filler material sealing together the parts to form a hermetic cavity inside the ceramic parts. Similarly, heating the glass alone or a mixture of 80% glass with 20% beta-eucryptite, fused silica or zircon, even at higher temperature for longer time, produced only partial recrystallization in the glass and the bond was weak and non-hermetic.

EXAMPLE 2

Lead borate glass X was intimately mixed 5 to 30% zinc zirconium silicate powders (300 mesh). The mixtures were heated at 410° C. A longer time was required to induce maximum recrystallization than in Example 1. The extent of recrystallization increased clearly as a function of zinc filler concentration and heating time. The glass alone or mixed with beta-eucryptite, silica or zircon showed no tendency to recrystallize.

EXAMPLE 3

An intimately mixed sealing glass material was produced by milling 82 parts glass VI with 18 parts of zinc zirconium spinel (zinc zirconium alumina silicate — $ZnO(Al_2O_3)_{0.855}(SiO_2)_{1.43}(ZrO\ 2)_{1.35}$) both as powders passing through a standard 300 mesh screen. 0.5 part of inert black colored stain was added. The mixture was applied to the surface of alumina ceramic parts (Cer-Dip). The parts were preglazed at 390° C. A prepunched metal lead frame was inserted in the melted base part and the package sealed at 430° C. for 15 minutes. Very tight and strong seals were obtained. These semiconductor packages were subjected to 30 cycles liquid-to-liquid thermal shocks (MIL-STD-883, method 1011, condition C) without affecting their hermeticity.

EXAMPLE 4

An intimately mixed sealing glass material was produced by milling 85 parts by weight glass XI with 10 parts zinc silicate and 5 parts zinc aluminate (300 mesh powders). The mixture was applied on cathode ray tube parts. The parts were sealed at 410° C. A strong, hermetic seal was produced.

EXAMPLE 5

An intimately mixed sealing glass material was produced by milling 80 parts by weight glass XI (Table 1), to which glass formulation were added 3% by weight lead fluoride ($PbF_2$), with 20 parts by weight zinc zirconium aluminum silicate (zinc zirconium spinel) both as powders passing through a standard 200 mesh screen.

The resulting very finely dispersed powder was formed into a printing paste by admixing it with an organic vehicle, the paste consisting by weight ratio about 89% powder and 11% vehicle. The resulting paste was screen printed on alumina lids, dried, and fired at 380° C. for about one minute to melt the sealing glass material, the thickness of the fused glass layer being of the order of 4 to 8 mils. The glazed alumina lids were inverted and brought into contact, and held into position by the pressure exerted by a metal clip, to a conventional microelectronic package alumina base. The structure was heated at a rate of 100° C. per minute to a peak of 400° C. for 1 – 5 minutes, then cooled at a rate of 60° C. per minute to room temperature. Alternately, the structure can be heated on a heater block maintained at 400° C. for 1 – 5 minutes, then annealed at 260° C. for a few minutes. When sealed under these conditions, the glass seal remained essentially vitreous.

The structure formed in Example 5 was subjected to an initial leak test as specified by Military Standard Test No. 883, method 1014 by using both condition A for fine leaks and condition C to test for large cracks. When so tested, the structure under test condition A passed the test in that it indicated a hermeticity level of less than $1 \times 10^{-8}$ cc/sec He.

The structure was then subjected to a thermal shock test as described in MIL-STD-883, method 1011, condition C by submerging the structure in a liquid held at 150° C. for 5 minutes and then quenching it in a dry ice bath held at −65° C. within 5 seconds, and held at that temperature for 5 minutes. The cycle is repeated 14 additional times. Leak test conditions A and C were then repeated and the structure again passed these tests, thus indicating the unusually strong nature of the sealing glass of this invention.

It is surprising that a seal produced by heating at so low a temperature and so short a time that the glass seal remained essentially vitreous would exhibit high hermeticity and high resistance to thermal shock. It is found, however, that such seals are effective so long as the thickness of the sealing layer does not exceed about 5 mils. If it is thicker, longer heating to induce devitrification is required to obtain the desired hermeticity and shock resistance in the finished seal.

The structure was subsequently heated to 400° C. for a time sufficient to induce recrystallization in the glass seal (about 10 – 15 minutes). This structure was subjected to the test conditions described in Example 5 with identical results.

EXAMPLE 6

A structure similar to the one described in Example 5 was prepared by using a gold plated Kovar (a low expansion alloy that can be sealed to glass) lid instead of an alumina ceramic lid. The structure was sealed under the same conditions as described in Example 5 with identical hermeticity and strength results, thus indicating the unusually strong and adherent sealing qualities of this invention, even to noble metals such as gold.

EXAMPLE 7

Two structures similar to the one described in Example 5 were prepared by using an ultraviolet radiation transparent glass lid (with a linear thermal expansion closely matching alumina) and a UV transparent alumina lid of the type applicable on silicon UV Erasable Programmable Read Only Memories (EPROM). Hermeticity and strength results were obtained which were essentially identical with those shown in Example 5.

It is readily apparent from these examples that high quality ceramic packages can be made using lead borate and zinc poor lead-zinc-borate glasses mixed with zinc oxide containing fillers. The fluidity and the recrystallization rate of these semi-stable sealing glass materials can be controlled by the proper selection of a glass from Table 1 and of zinc containing filler or combination of fillers. Thus, the so-called working properties and working range of these sealing materials can be adjusted over wide limits according to the particular application.

It should be noted that all of the glasses shown in Table 1 have a small content of $SiO_2$. The presence of $SiO_2$ in amount at least about 0.5% by weight of the glass-filler mixtures is highly desirable since the $SiO_2$ slows crystallization of the glass and so permits better control in producing a properly sealed package. The selection of the solder glass and filler should be made with a view to producing a mixture having an $SiO_2$ content of at least 0.5% by weight.

It should be noted also that lead-borate glasses (glasses VIII, IX and X in Table 1) and lead-zinc-borate glasses (the other glasses in Table 1) may contain minor proportions of other oxides as shown which make minor modifications of the glass properties. The terms lead-borate glass and lead-zinc-borate glass are used in the sense that these very minor proportions of modifying oxides may be present.

What is claimed is:

1. The method of sealing ceramic, glass or metal bodies together which comprises sandwiching a mixture of a finely divided solder glass selected from the group consisting of lead-boron glasses and zinc-lead-boron glasses in which the zinc oxide:lead oxide mol ratio is below 1:2 and a finely divided oxygen containing zinc material selected from the group consisting of zinc silicate, zinc zirconium silicate, zinc oxide, zinc aluminate, zinc zirconate, zinc stannate, zinc zirconium aluminum silicate and mixtures thereof, the zinc material being present in amount in the range 3 to 30% by weight of the total mixture, between the bodies, heating the resultant assembly to a temperature at which the mixture softens and wets the bodies, holding the assembly at such temperature for several minutes and then cooling the assembly to ambient temperature.

2. The method defined in claim 1 wherein 2 to 5% by weight of lead fluoride is added to the mixture of solder glass and oxygen containing zinc material.

3. Assemblies produced according to claim 1.

4. A glass, metal or ceramic body having its surface covered by a hermetic sealing coat formed by covering its surface with a mixture comprised of a finely divided solder glass selected from the group consisting of lead-boron glasses and zinc-lead-boron glasses in which the zinc oxide:lead oxide mol ratio is below 1:2 and a finely divided oxygen containing zinc material selected from the group consisting of zinc silicate, zinc zirconium silicate, zinc oxide, zinc aluminate, zinc zirconate, zinc stannate, zinc zirconium aluminum silicate and mixtures thereof, the zinc material being present in an amount in the range 3 to 30% by weight of the total mixture, heating the thus covered body to a temperature at which the covering mixture softens and wets the body surface, holding the body at such temperature for several minutes and then cooling it to ambient temperature.

5. Glass, metal or ceramic bodies having their surfaces coated with a hermetic seal according to the method of claim 2.

6. A printing paste comprising a mixture of a finely divided solder sealing glass selected from the group consisting of lead-boron glasses and lead-zinc-boron glasses in which the zinc oxide:lead oxide ratio is below 1:2 and a finely divided oxygen containing zinc material selected from the group consisting of zinc silicate, zinc zirconium silicate, zinc oxide, zinc aluminate, zinc zirconate, zinc stannate, zinc zirconium aluminum silicate and mixtures thereof, the zinc material being present in amount in the range 3 to 30% by weight of the total mixture, dispersed in an organic liquid vehicle.

7. The paste defined in claim 6 wherein the solid:liquid ratio is in the range 12:1 to 7:1.

* * * * *